United States Patent Office 3,425,602  
Patented Feb. 4, 1969

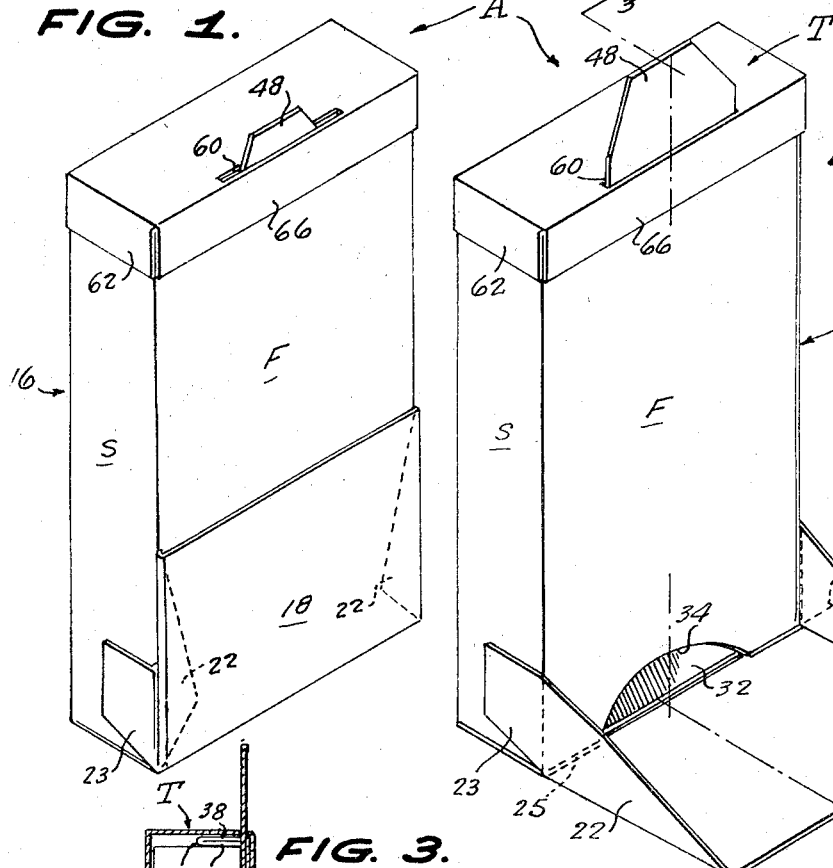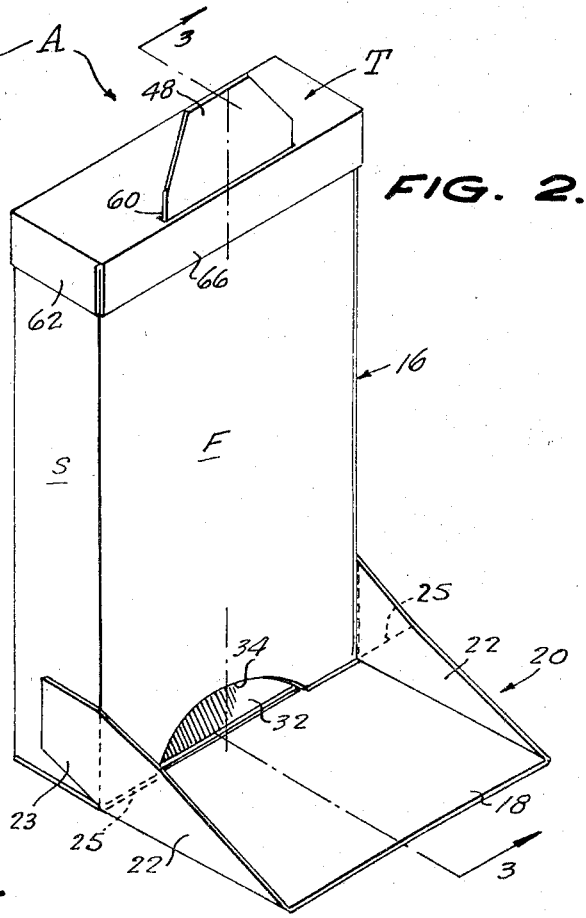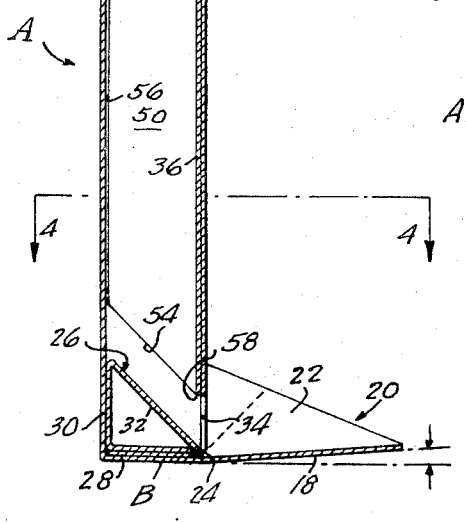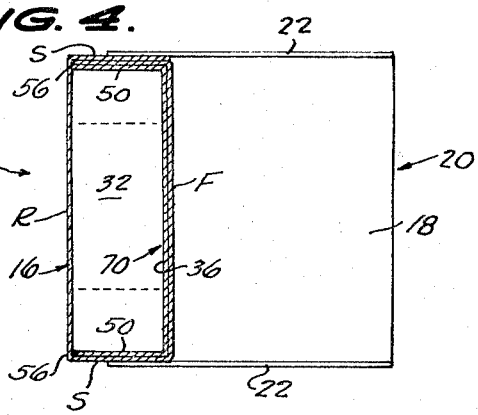

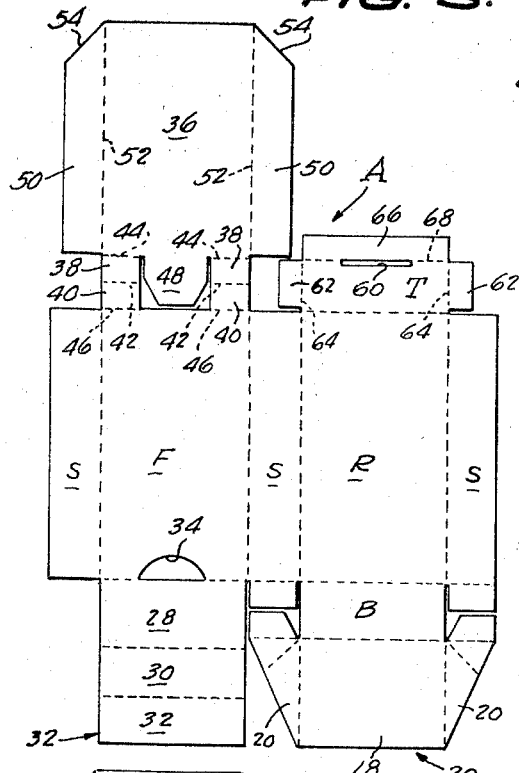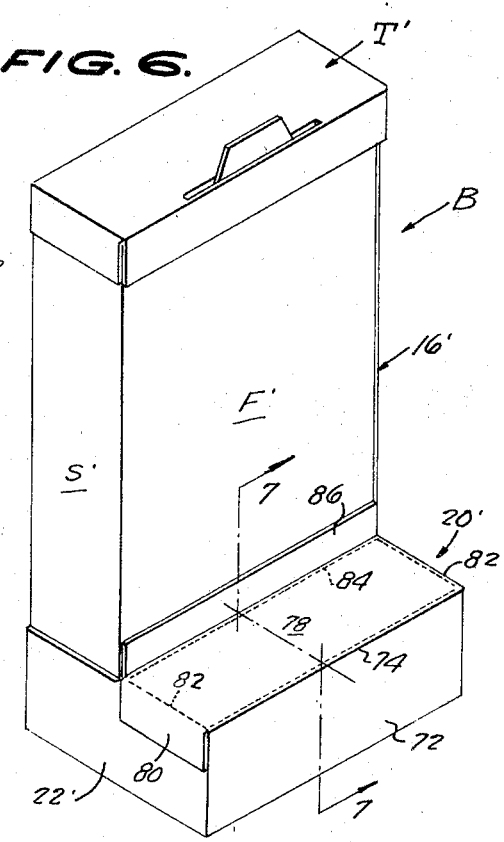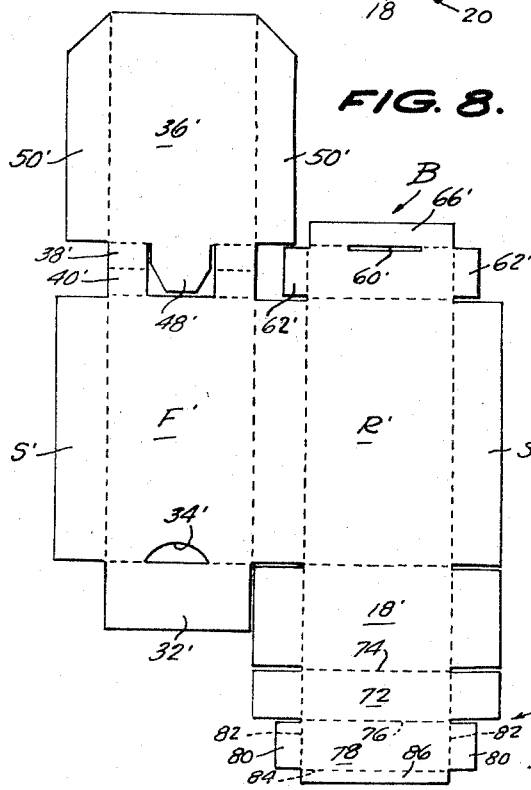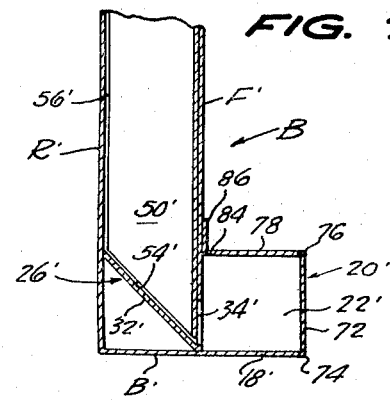

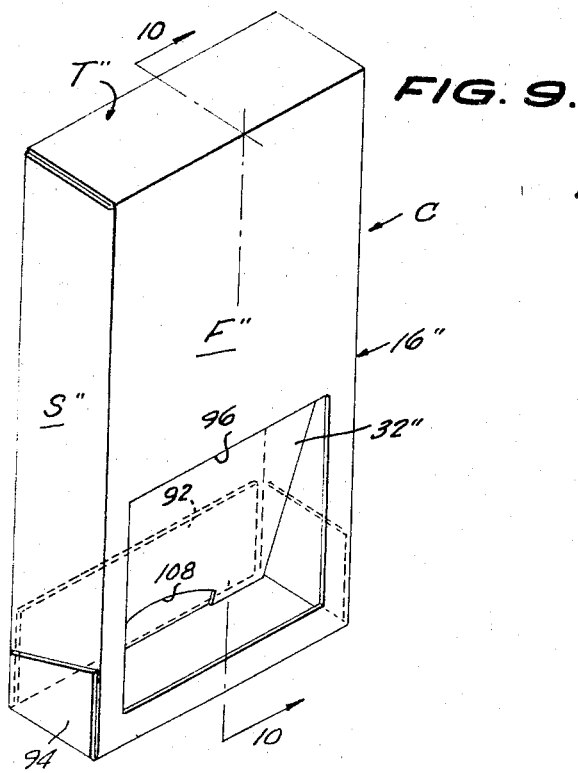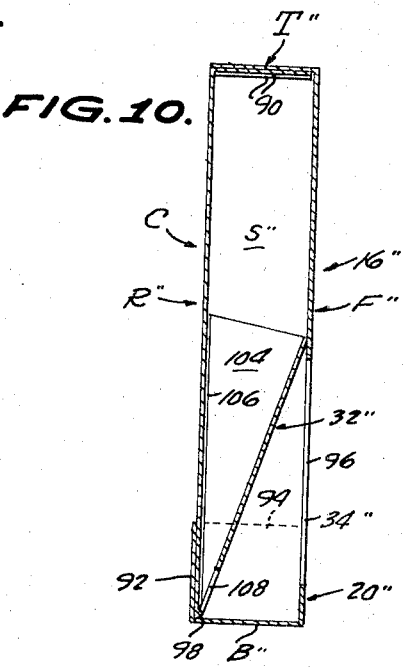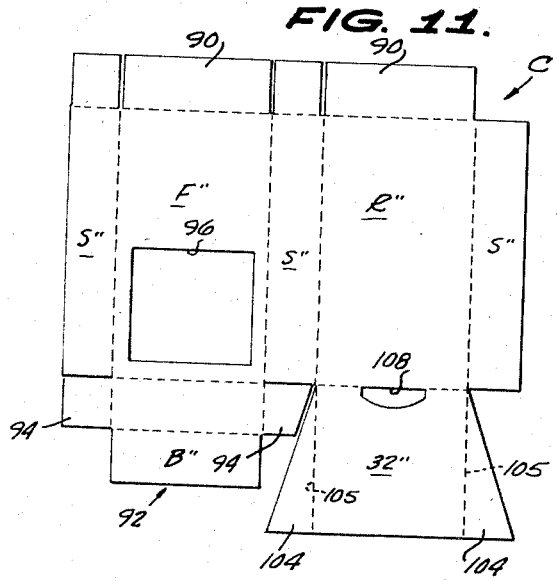

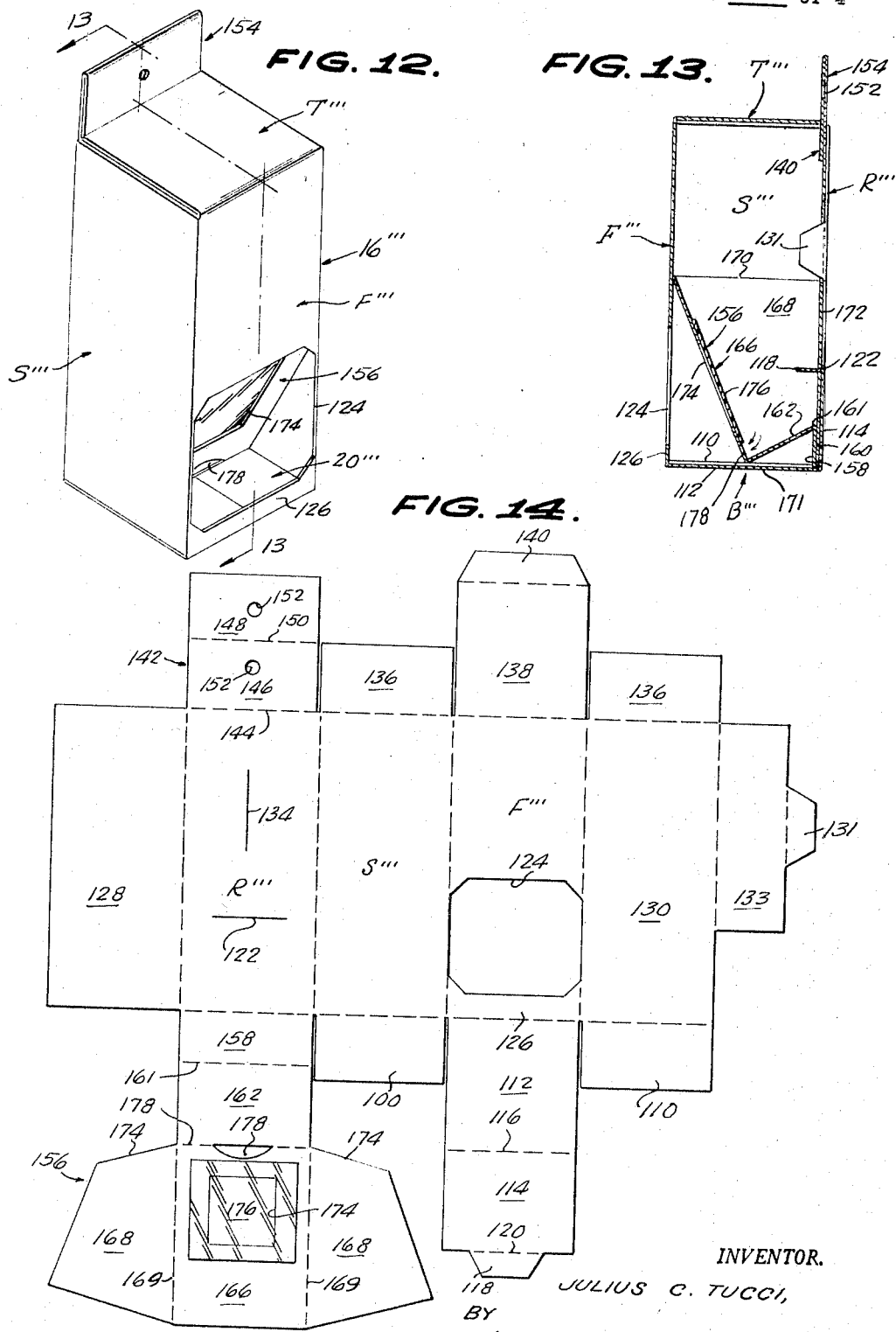

3,425,602  
ONE-PIECE SEED DISPENSING CARTON  
Julius C. Tucci, 181 W. 2nd St., Weston, W. Va. 26452  
Continuation-in-part of application Ser. No. 545,192, Apr. 1, 1966. This application Feb. 21, 1967, Ser. No. 623,175  
U.S. Cl. 222—457      14 Claims  
Int. Cl. B65d 25/52, 47/08; G01f 13/00

ABSTRACT OF THE DISCLOSURE

A one-piece seed dispensing carton comprising a single, flat sheet of relatively rigid but foldable material cut and scored to form a container having front and rear walls, top and bottom walls and side walls; a seed delivery opening in said front wall and means inside the carton for guiding said seed to said opening.

---

This invention relates to dispensing cartons constructed of one-piece blanks, and is a continuation-in-part of my copending application, Ser. No. 545,192, filed Apr. 1, 1966, now abandoned.

The primary object of the invention is the provision of more efficient and economical cartons of the kind indicated, which are adapted to contain and dispense granular, comminuted, or flake materials, and which in their preferred forms, involve container bodies which are vertically elongated in order to obtain the advantage of gravity in the downward movements of contained materials, the container bodies being provided, at their lower ends, with dispensing and discharging means which include openings in the container body walls, and downwardly angled false bottoms.

A further object of the invention is the provision, in cartons of the character indicated above, of tray or receiver means, onto which the material is dispensed, from the container bodies, which tray means can perform the desirable function of holding and guiding the dispensed material, as in pouring the material accurately.

A still further object of the invention is the provision, in cartons of the character indicated above, of movable valve means, adapted to cooperate with the dispensing or discharging openings of the cartons, for controlling the flow of material from their container bodies.

In the drawings:

FIGURE 1 is a front perspective view of one form of carton of the present invention, showing its tray in closed position;

FIGURE 2 is a view, like FIGURE 1, showing the tray in open position;

FIGURE 3 is a vertical transverse section, taken on the line 3—3 of FIGURE 2;

FIGURE 4 is a horizontal section, taken on the line 4—4 of FIGURE 3;

FIGURE 5 is a plan view of the single blank from which the carton of FIGURES 1 to 4 is formed;

FIGURE 6 is a front perspective view of another form of carton of the present invention;

FIGURE 7 is a fragmentary vertical section, taken on the line 7—7 of FIGURE 6;

FIGURE 8 is a plan view of the single blank from which the carton of FIGURES 6 and 7 is formed;

FIGURE 9 is a front perspective view of a further form of carton of the present invention;

FIGURE 10 is a vertical section, taken on the line 10—10 of FIGURE 9;

FIGURE 11 is a plan view of the single blank from which the carton of FIGURES 9 and 10 is constructed;

FIGURE 12 is a front perspective view of another form of carton of the present invention;

FIGURE 13 is a vertical section, taken on the line 13—13 of FIGURE 12; and

FIGURE 14 is a plan view of the blank from which the carton of FIGURES 12 and 13 is formed.

Referring in detail to the drawings, and first to FIGURES 1 to 5 thereof, the carton A therein shown, comprises a vertically elongated rectangular container 16, having a front wall F, a rear wall R, side walls S, a top wall T, and a bottom wall B, all formed from a single blank.

The bottom wall B is formed with a rectangular panel 18, adapted to extend forwardly from the front wall F, when in down-folded open position, as the bottom wall of a receiver or tray 20. Triangular flaps 22, flaring rearwardly, are along the side edges of the panel 18, and reach upwardly therefrom, to form sides for the tray 20. The flaps 22 have tabs 23, on their rear ends, which are secured to the outer sides of the container side walls S, as shown in FIGURES 1 and 2. Diagonal fold lines 25 connect tabs 23 with the flaps 22, and the flaps fold inwardly behind the panel 18 in the closed position of the tray.

The front wall F has a transverse fold 24, on its lower end, to which is connected a right-triangular cross section false bottom 26, composed of a bottom wall 28, resting upon the container bottom wall B, a perpendicular back wall 30, bearing against the container rear wall R, and a downwardly and forwardly angled top wall 32 which is connected to the fold 24. The angled top wall 32, of the false bottom 26, is provided to move material, in the container 16 downwardly and forwardly, onto the tray 20, through an arcuate, centered dispensing opening 34, formed in the container front wall F, at the lower end thereof.

As shown in FIGURE 5, the container front wall F is further formed, on its upper end, with an extension which comprises a vertically elongated valve panel 36, of the width of the front wall, and shorter than the front wall. The panel 36 is connected to the upper end of the front wall F, by two laterally spaced pairs of hinge panels 38 and 40. The panels 38 and 40 are connected together by folds 42. The panels 38 are connected to the valve panel 36, by folds 44. The hinge panels 40 are connected to the upper end of the container front wall F, by folds 46.

Located between and slightly spaced from the pairs of hinge panels 38, 40 is a single handle tab 48 which is an extension of the adjacent edge of the valve panel 36. The valve panel 36 has flaps 50 along its side edges which are connected thereto by means of folds 52. The ends of the flaps 50, remote from the front wall F, are cut off at an angle, as indicated at 54. As shown in FIGURE 3, the valve panel 36 is slidably engaged with the rear side of the container front wall F, with its flaps 50 slidably engaged with the inner surfaces of the container side walls S, and with the free edges 56, of the flaps, slidably engaged with the forward surface of the container rear wall R. Normally, the valve panel 36 occupies an elevated position, as shown in FIGURE 3, wherein the angled lower edges 54 of the flaps 50, and the then lower edge 58 of the valve panel, are spaced upwardly, from the angled top wall 32 of the false bottom 26, and the bottom wall B, of the container, so that material present in the container 16, is free to flow out through the dispensing opening 34, in the front wall F, onto the tray 20.

The handle tab 48, on the valve panel 36, is slidably extended upwardly through an accommodating slot 60, provided in the container top wall T. The top wall T has side tabs 62, connected to the ends thereof, by folds 64, and a single front flap 66, and a fold 68 connects the top wall with the upper end of the container rear wall R.

The tabs 62 and the flap 66 are normally suitably secured against the outer surfaces of the related walls of the container 16.

In the depressed or closed position of the valve assembly 70, of which the valve panel 36 and its flaps are components, as shown in FIGURE 7, relating to another form of the invention, the valve panel 36 closes the dispensing opening 34 of the front wall F, so that material in the container is retained therein. The depressed position of the valve assembly 70 is obtained by pushing down on the handle tab 48, so that the hinge panels 38, 40 fold downwardly, from the horizontal positions thereof shown in FIGURE 3, and flex relative to each other and to the front and side walls, of the container, on the fold lines which connect them to the container front wall F, and the valve panel 36.

The form of carton B, shown in FIGURES 6 to 8, is similar in construction to the carton A, of FIGURES 1 to 5, except for the construction of its tray 20', and primed related numerals are used to designate corresponding components.

The tray 20' has a bottom panel 18', along whose sides are upstanding rectangular flaps 22' which extend rearwardly along and are fixed to the outer sides of the side walls S' of the container 16'. An upstanding front wall 72 is connected by a fold 74 to the front edge of the panel 18' and extends between and is connected to the related ends of the flaps 22'. A fold 76, on the upper end of the front wall 72 connects thereto a rearwardly extending top panel 78, which rests upon the upper edges of the flaps 22' and the wall 72. The top panel 78 extends the container front wall F' and has thereat a fold 84, to which is connected a short upstanding tab 86, which bears against the front wall F'. This arrangement produces a closed box-like tray 20'.

The false bottom 26', of the carton B, differs from that of Carton A, in that the false bottom 26' consists of a single downwardly and forwardly angled panel 32'.

The carton C, of FIGURES 9 to 11, has in common with the cartons A and B, a generally comparable container 16", composed of a rear wall R", a front wall F", a bottom wall B", and side walls S"; and a top wall T" which is formed of overlapped and secured top wall panels 90.

A reinforcing strip 92 of substantial width extends across the rear wall R", at the lower end thereof, and has tabs 94, on its ends, which are secured to the outer sides of the side walls S" of the container 16".

The front wall F" is formed, in its lower part, with a large centered rectangular opening 96, providing access to the interior of the lower part of the container 16". A false bottom panel 32" extends downwardly and rearwardly from the front wall F", from a point just above the opening 96, to the lower end of the rear wall R", to which it is joined by a fold 98. The strip 92 has a fold 100 on its lower end which joints thereto, the bottom wall B" of the container 16", which, at its forward end is joined by a fold 102, to the lower end of the front wall F". The false bottom panel 32" has triangular flaps 104, on its side edges, connected thereto by folds 105, which engage the inner surfaces of the container side walls S", with their free edges 106, engaged with the container rear wall R". The panel 32" is provided, adjacent to its lower end, with a centered relatively narrow and small material discharge opening 108, through which material is deposited in the tray 20", defined by the lower part of the container 16" beneath the access opening 96.

The carton shown in FIGURES 12 to 14, and generally designated D, has in common with forms A, B and C, a vertically elongated rectangular container 16''', composed of a rear wall R''', side walls S''', a top wall T''', and a bottom wall B''', and a front wall F''', formed from the single blank shown in FIGURE 14.

The bottom wall B''' is composed of a pair of half-width panels 110, extending inwardly from the side walls S''', and a full-width bottom panel 112, extending rearwardly from the lower end of the front wall F''' and underlying the panels 110. The bottom panel 112 has an extension 114, on its rear end, and connected thereto by a fold line 116. The extension 114 is engaged with the rear side of the rear wall R''', and has a reduced width, centered and tapered tab 118, on its upper end, connected to the extension 114, by a fold line 120. The tab is engaged forwardly through a horizontal slot 122, formed in the rear wall R''', as indicated in FIGURE 13.

A relatively large access opening 124 is provided in the lower part of the front wall F''', and is spaced upwardly from the lower end of the front wall, so as to provide a low profile retaining wall 126.

Onet of the side walls S''' is in the nature of a single panel of material, while the other side wall comprises an inner side wall panel 128, extending forwardly from the rear wall R''', and an outer wall panel 130, extending rearwardly from the front wall F''', and engaged with the outer side of the inner panel 128. The outer panel 130 has, on its rear edge, a narrower reduced width and heighth panel 133, which is formed with a reduced width tapered tab 131, which is adapted to be engaged through a centered vertical slot 134, provided in the rear wall R''', as shown in FIGURE 13, for assembling the container 16'''.

The top wall T''', which is adapted to be opened for access to the interior of the container, comprises half-width panels 136, on the upper ends of the side walls S''', which are overlaid by a full-width top wall panel 138, on the upper end of the front wall F'''. The panel 138 terminates in a relatively narrower tongue 140 which extends downwardly from the panel 138 and bears against the forward surface of the rear wall R'''.

An extension 142, on the upper end of the rear wall R''', is connected thereto by a fold line 144, and is composed of relatively narow rear and front panels 146 and 148, respectively, which are connected together by a fold line 150. The front panel 148 is bent downwardly and is engaged with the front side of the rear panel 146, and registered centered openings 152 are provided, in these panels, whereby a suspension tab 154 is defined, having a hole therethrough adapted to be engaged over a nail or other suspension means, on a support.

A gravity-operated material guiding and dispensing assembly indicated generally by 156, comprises an elongated strip having a relatively narrow vertical rear panel 158, extending upwardly from the bottom wall B''', and secured in place chiefly by the interfitting of the parts, though this may be supplemented by staples, adhesive or any other suitable means.

A downwardly and forwardly angled false bottom panel 162 is hinged, as indicated at 161, to the upper edge of the rear panel 158, and is about half the front to rear width of the container bottom wall B'''. On the lower forward end of the bottom panel 162 is hinged, as indicated at 171, a full-width rearwardly and downwardly angled gravity dispensing panel 166. The panel 166 reaches to the front wall F'''. On the side edges of the panel 166 are wings 168, connected thereto by fold lines 169, which engage the inner sides of the side walls S'''. The wings 168 have free horizontal upper edges 170, and free perpendicular rear edges 172, the latter being engaged with the rear wall B'''. Angled lower edges 174, on the wings 168, conform to and engage the upper surface of the bottom panel 162.

The dispensing panel 166 is formed with a rectangular, centered viewing opening 174, extending for the major portion of the width thereof, the opening 174 being covered by a transparent sheet 176, suitably secured to the rear side thereof. The viewing opening 174 provides for a constant check on the level of the contents of the container. Below the opening 176 and extending to the lower edge of the dispensing panel 166 and the forward end of the angled bottom panel 162, the panel 166 is provided with a centered semi-circular dispensing opening 178.

The arrangement, in the carton D, of the dispensing assembly 156, provides that the level of the material dispensed gravitationally, through the opening 178, is visible above the tray 20''', defined between the retaining wall 126 and the dispensing panel 166, that is, in a forward and readily accessible location. Where the carton D is used as a dispenser of bird seed, this arrangement makes the seed more accessible to birds and easier to reach, and eliminates undesirable reaching by birds into the interior of the container 16'''.

In the depressed position of the assembly 156, shown in FIGURE 13, when the hinge 171 bears upon the container bottom wall B''', the panel 162 is disposed at an optimum angle to the horizontal for dispensing the material by gravity.

Several different forms of essentially the same overall function have been disclosed herein. Clearly, additional structural changes may suggest themselves to those skilled in the art, or, indeed, be dictated by the exigencies of the equipment used to form the blank and to assemble the product for shipment or use. This invention, therefore, is not to be limited to the details disclosed herein, but only as set forth in the subjoined claims.

What is claimed is:

1. A one-piece dispensing carton comprising a single flat sheet of relatively rigid but foldable material cut and scored and folded to form an upright container having a front wall, a rear wall, side walls, a top wall, and a bottom wall, said front wall being formed in its lower part with a dispensing opening, a valve panel forming part of said sheet positioned within said container and movable vertically therein, said valve panel being adapted to occupy a depressed position in which the valve panel serves to prevent material in the container from reaching said dispensing opening and an elevated position wherein the valve panel frees material present in the container to pass through said dispensing opening.

2. A one-piece dispensing carton according to claim 1, wherein said container is formed, at its lower end, with a forwardly extending horizontal receiver for material dispensed through said dispensing opening, a component of the receiver being a part of the container bottom wall.

3. A one-piece dispensing carton according to claim 2, wherein said receiver normally is in closing relation to the dispensing opening and adapted to have a component thereof moved, relative to the front wall of the container for exposing the dispensing opening.

4. A one-piece dispensing carton according to claim 3, wherein said receiver includes at least one component which is stationary relative to the container.

5. A one-piece dispensing carton according to claim 3, wherein said receiver is hingedly connected to the container, the receiver normally being in an upfolded position against the front wall of the container and adapted to be folded down relative to the container to material receiving position.

6. A dispensing carton according to claim 1, wherein said valve panel is slidably engaged with the rear side of the container front wall, means hingedly connecting the valve panel at its upper end to the upper end of the container front wall, an upstanding handle tab on the upper end of the valve panel, the container top wall being formed with a slot through which said handle tab extends.

7. A dispensing carton according to claim 6, wherein said container front wall is formed on its lower end with a rearwardly and upwardly angled panel defining a false bottom for conveying material from the container downwardly and forwardly through the dispensing opening.

8. A dispensing carton according to claim 7, wherein said false bottom consists of a single panel.

9. A dispensing carton according to claim 6, wherein said false bottom comprises a horiozntal panel resting upon the container bottom wall, an upright panel engaged with the front surface of the container rear wall, and a downwardly and forwardly angled top panel on the upper end of said upright panel, said top panel having a forward edge engaged with the rear surface of the container front wall beneath the discharge opening.

10. A one-piece dispensing carton comprising a single flat sheet of relatively rigid but foldable material cut and scored and folded to form a container having a front wall, a rear wall, side walls extending between the front and rear walls, flap means on the upper edges of said walls forming a top wall for the container, a strip secured to the rear side of the rear wall at the lower end thereof, said strip having tabs secured to the outer sides of the container side walls, said strip having a forwardly extending panel defining a bottom wall for the container, the bottom wall having a fold connecting the bottom wall to the lower end of the front wall, said front wall being formed in its lower part with an access opening, and an apertured false bottom within the container and extending diagonally of the carton and across the access opening.

11. A one-piece dispensing carton according to claim 10, wherein said false bottom comprises a panel having a lower end connected by a fold to the lower end of the container rear wall, and an upper end bearing against the rear surface of the front wall above said access opening, said false bottom panel being formed adjacent to its lower end with a relatively small centered material discharge opening, said panel having side flaps engaged with the forward surface of the container rear wall.

12. A one-piece dispensing carton according to claim 1, wherein said bottom wall extends forwardly beyond said front wall, the part of said bottom wall in front of said front wall having upstanding flaps, and an upstanding wall on the forward end of said part of the bottom wall, said part of the container bottom wall, said upstanding flaps and the last-mentioned front wall constituting a material receiver.

13. A one-piece dispensing carton comprising an upright container composed of a back wall, a front wall, side walls, a top wall, and a bottom wall, the front wall being formed in its lower part with an access opening, a gravity dispensing assembly positioned in the lower part of the container and facing said access opening, said dispensing assembly comprising a false bottom panel angled with respect to said bottom wall and declining toward said access opening from the container back wall, wherein said dispensing assembly extends between and is engaged with the container side walls, said assembly having a dispensing panel angled downwardly and rearwardly to the lower end of the false bottom panel, and the false bottom panel being hinged on the back wall of the container.

14. A one-piece dispensing carton comprising an upright container composed of a back wall, a front wall, side walls, a top wall, and a bottom wall, the front wall being formed in its lower part with an access opening, a gravity dispensing assembly positioned in the lower part of the container and facing said access opening, said dispensing assembly comprising a false bottom panel angled with respect to said bottom wall and declining toward said access opening from the container back wall, wherein said false bottom panel is hinged on the container back wall at a point spaced above the container bottom wall, said false bottom panel being angled forwardly and downwardly toward the container bottom wall, a dispensing panel hinged at its lower end to the lower edge of said bottom panel, said dispensing panel extending at an upward and forward angle with its upper end engaged with the container front wall, said dispensing panel being formed with a dispensing opening at its lower end, said dispensing panel having wings on its side edges, said wings being engaged with the container side walls, the container top wall being openable to provide access to the interior of the container.

References Cited

UNITED STATES PATENTS

| | | | |
|---|---|---|---|
| Re. 21,398 | 3/1940 | Thor | 221—55 |
| 84,538 | 12/1868 | Davis | 222—457 |
| 292,802 | 2/1884 | Gowdy et al. | 229—17 |
| 1,000,624 | 8/1911 | Pexton | 229—17 |
| 1,189,779 | 7/1916 | Becker | 229—17 |
| 1,460,226 | 6/1923 | Collis. | |
| 1,628,981 | 5/1927 | Horwitt | 221—63 X |
| 2,650,451 | 9/1953 | Karstedt | 229—7 X |
| 3,090,532 | 5/1963 | Robson | 222—457 X |
| 3,094,244 | 6/1963 | White | 222—572 X |

SAMUEL F. COLEMAN, *Primary Examiner.*